United States Patent
Flumeri et al.

(10) Patent No.: US 11,628,826 B2
(45) Date of Patent: Apr. 18, 2023

(54) METHOD TO CONTROL, WHILE DRIVING ALONG A CURVE, A ROAD VEHICLE WITH A VARIABLE STIFFNESS AND WITH REAR STEERING WHEELS

(71) Applicant: FERRARI S.p.A., Modena (IT)

(72) Inventors: Alessandro Flumeri, Modena (IT); Francesca Mincigrucci, Modena (IT); Stefano Varisco, Modena (IT)

(73) Assignee: FERRARI S.p.A., Modena (IT)

(*) Notice: Subject to any disclaimer, the term of this patent is extended or adjusted under 35 U.S.C. 154(b) by 242 days.

(21) Appl. No.: 17/173,918

(22) Filed: Feb. 11, 2021

(65) Prior Publication Data
US 2021/0245733 A1    Aug. 12, 2021

(30) Foreign Application Priority Data
Feb. 12, 2020 (IT) .................. 102020000002746

(51) Int. Cl.
*B60W 30/045* (2012.01)
*B60G 17/015* (2006.01)
(Continued)

(52) U.S. Cl.
CPC ....... *B60W 30/045* (2013.01); *B60G 17/0152* (2013.01); *B60G 17/06* (2013.01);
(Continued)

(58) Field of Classification Search
CPC .... B60W 30/045; B60W 10/20; B60W 10/22; B60W 40/08; B60W 40/114;
(Continued)

(56) References Cited

U.S. PATENT DOCUMENTS 9,988,044 B2 * 6/2018 Varisco .............. B62D 6/003
2003/0225495 A1 * 12/2003 Coelingh .......... B60W 10/04
701/41
(Continued)

FOREIGN PATENT DOCUMENTS

EP    3153382 A1    4/2017
JP    4231910 B2 *    3/2009 ......... B60K 23/0808

OTHER PUBLICATIONS

Search Report issued in Italian Patent Application No. 202000002746 completed Oct. 16, 2020; 7 pages.
(Continued)

*Primary Examiner* — Dale W Hilgendorf
(74) *Attorney, Agent, or Firm* — Cantor Colburn LLP

(57) ABSTRACT

A method to control, while driving along a curve, a road vehicle with a variable stiffness and with rear steering wheels. The method comprises the steps of: determining an actual attitude angle of the road vehicle; establishing a desired attitude angle; determining an actual yaw rate of the road vehicle; establishing a desired yaw rate; and changing, in a simultaneous and coordinated manner, the steering angle of the rear wheels and the distribution of the stiffness of the connection of the four wheels to the frame depending on a difference between the actual attitude angle and the desired attitude angle and depending on a difference between the actual yaw rate and the desired yaw rate.

16 Claims, 5 Drawing Sheets

(51) Int. Cl.
  *B60G 17/06* (2006.01)
  *B60G 21/10* (2006.01)
  *B60W 10/20* (2006.01)
  *B60W 10/22* (2006.01)
  *B60W 40/08* (2012.01)
  *B60W 40/114* (2012.01)
  *B62D 6/00* (2006.01)
  *B60W 30/18* (2012.01)

(52) U.S. Cl.
  CPC ............. *B60G 21/10* (2013.01); *B60W 10/20* (2013.01); *B60W 10/22* (2013.01); *B60W 40/08* (2013.01); *B60W 40/114* (2013.01); *B62D 6/003* (2013.01); *B60G 2400/0513* (2013.01); *B60W 30/18145* (2013.01); *B60W 2510/20* (2013.01); *B60W 2510/22* (2013.01); *B60W 2520/14* (2013.01); *B60W 2710/207* (2013.01); *B60W 2710/22* (2013.01)

(58) Field of Classification Search
  CPC ....... B60W 30/18145; B60W 2510/20; B60W 2510/22; B60W 2520/14; B60W 2710/207; B60W 2710/22; B60G 17/0152; B60G 17/06; B60G 21/10; B60G 2400/0513; B62D 6/003
  See application file for complete search history.

(56) References Cited

U.S. PATENT DOCUMENTS

| | | | |
|---|---|---|---|
| 2005/0131604 A1* | 6/2005 | Lu | B60W 30/04 701/38 |
| 2005/0206234 A1* | 9/2005 | Tseng | B60W 30/045 303/146 |
| 2012/0109411 A1 | 5/2012 | Tokimasa et al. | |
| 2021/0188252 A1* | 6/2021 | Lu | B60W 40/12 |
| 2021/0213935 A1* | 7/2021 | Lu | B60W 10/18 |
| 2021/0370951 A1* | 12/2021 | Kim | B60W 40/112 |
| 2022/0080953 A1* | 3/2022 | Hwang | B60W 30/045 |

OTHER PUBLICATIONS

Wu et al., "Integrated Effects of Active Suspension and Rear-Wheel Steering Control Systems on Vehicle Lateral Stability", Konferenzbeitrag "IBEC 2003" SAE International, vol. 1, Mar. 28, 2017, XP055738637, 13 pages.

Zhu et al., "Integrated chassis control for vehicle rollover prevention with neural network time-to-rollover warning metrics", Advances in Mechanical Engineering, vol. 8, No. 2, Feb. 1, 2016, XP055700802, 14 pages.

* cited by examiner

METHOD TO CONTROL, WHILE DRIVING ALONG A CURVE, A ROAD VEHICLE WITH A VARIABLE STIFFNESS AND WITH REAR STEERING WHEELS

CROSS-REFERENCE TO RELATED APPLICATIONS

This Patent application claims priority from Italian Patent Application No. 102020000002746 filed on Feb. 12, 2020, the entire disclosure of which is incorporated herein by reference.

TECHNICAL FIELD

The invention relates to a method to control, while driving along a curve, a road vehicle with a variable roll stiffness and rear steering wheels.

PRIOR ART

Four wheel steering vehicles, also known as 4WS vehicles, have been produced by the automotive industry for many years, even though there are not many available models, which are mainly based on passive mechanical system, which only allow "fixed" steering angles to be imparted to the rear wheels. In these passive mechanical systems, the rear wheels are coupled to the front wheels so as to impart fixed steering angles to the rear wheels when the front wheels are steered.

More modern, dynamic systems, which are provided with an (electric or hydraulic) active actuator controlled by an electronic control unit, allow the steering of the rear wheels to be controlled by imparting, to the rear wheels, steering angles that are variable within a predetermined range.

While driving along a curve at a high speed (for example exceeding 60 km/h), the steering of the rear wheels increases the stability of the vehicle, in particular close to a grip loss; in order to improve the stability of the vehicle while it drives along a curve at a high speed, the rear wheels are caused to steer in phase (namely, in the same direction as the steering of the front wheels, which means that, when the front wheels steer to the right, the rear wheels steer to the right as well) in order to reduce the yaw angle, thus making it easier for the vehicle to be controlled. In other words, the in-phase steering of the rear wheels counters the centrifugal force that tends to cause the rear part of the vehicle to skid while driving along the curve, thus allowing the rear part of the vehicle to adapt to the ideal trajectory, increasing stability and effectiveness. In this situation, the rear wheels are caused to steer with a steering angle that usually is smaller than 1-2° and depends on the steering angle of the front wheels.

In case of manoeuvres at a low speed (for example up to 60 km/h), the steering of the rear wheels significantly decreases the steering radius, in particular, in order to increase the manoeuvrability of the vehicle at a low speed, the rear wheels are caused to steer in counter-phase (namely, in an opposite direction relative to the steering of the front wheels, which means that, when the front wheels steer to the right, the rear wheels steer to the left and vice versa) with a maximum steering angle of 3-5°, depending on the steering angle of the front wheels.

Patent application EP3153382A1 describes a method to control, while driving along a curve, a road vehicle with rear steering wheels; the control method comprises the steps of: determining an actual attitude angle of the road vehicle, determining a desired attitude angle, and changing the steering angle of the rear wheels depending on the difference between the actual attitude angle and the desired attitude angle.

The article "*Integrated Effects of Active Suspension and Rear-Wheel Steering Control Systems on Vehicle Lateral Stability*" (Liang Wu et al., Konferenzbeitrag "*IBEC* 2003" and SAE Technical Paper Series 2002-01-20 48, vol. 1, 28 Mar. 2017, XP055738637, US ISSN: 0148-7191, DOI: 10.4271/2017-01-0257) describes a method to control, while driving along a curve, a road vehicle with a variable stiffness and rear steering wheels.

DESCRIPTION OF THE INVENTION

The object of the invention is to provide a method to control, while driving along a curve, a road vehicle with a variable stiffness and rear steering wheels, said control method maximizing the performances of the road vehicle while driving along a curve without making the road vehicle unstable and, at the same time, being easy and economic to be implemented.

According to the invention, there is provided a method to control, while driving along a curve, a road vehicle with a variable roll stiffness and rear steering wheels as claimed in the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
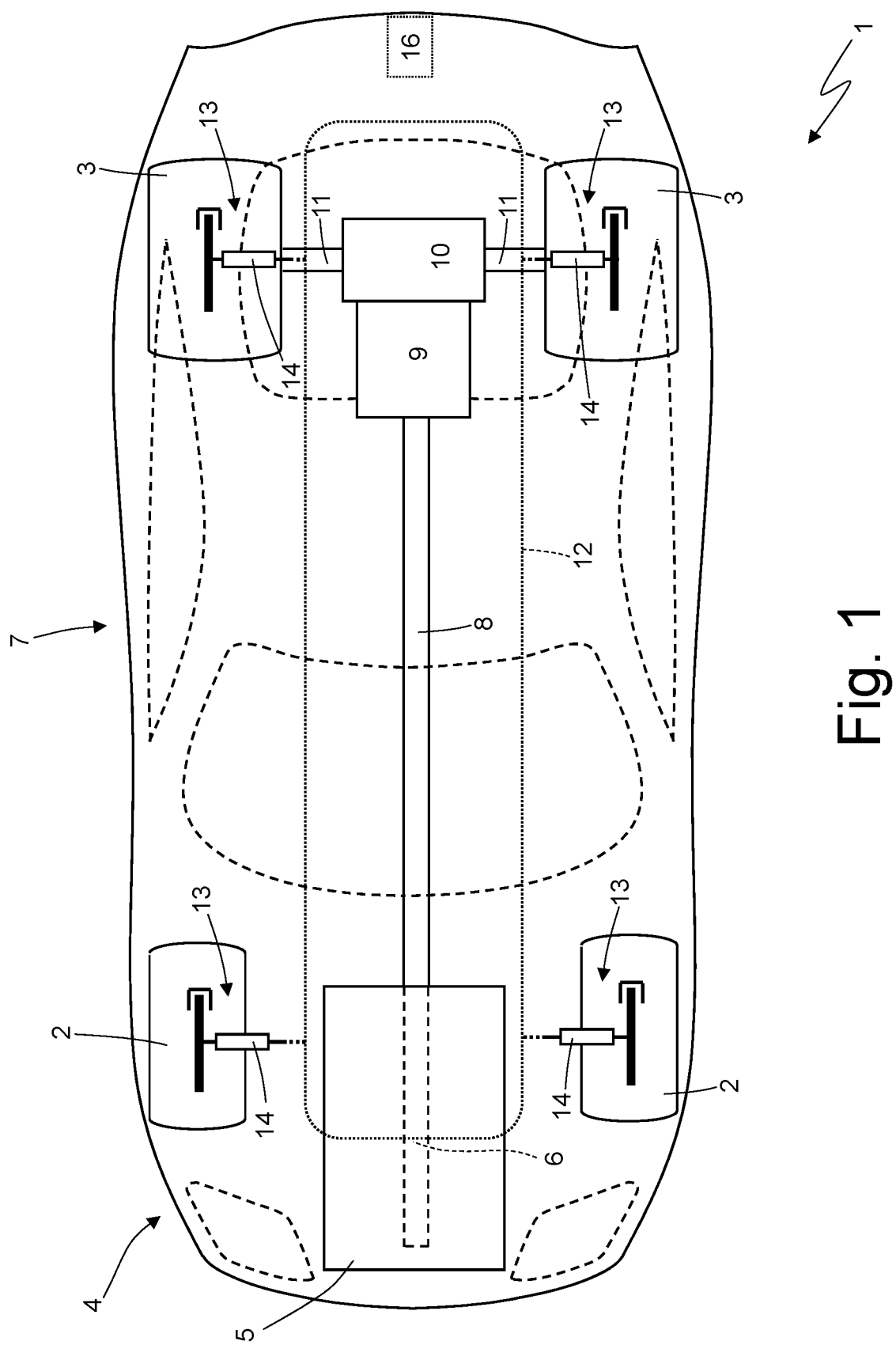
FIG. 1 is a schematic plan view of a road vehicle provided with a rear steering wheels, which are controlled according to the invention.

In FIG. 1, number 1 indicates, as a whole, a road vehicle provided with two front wheels 2 and two rear drive wheels 3, which receive the torque from a powertrain system 4.

The powertrain system 4 comprises an internal combustion heat engine 5, which is arranged in a front longitudinal position and is provided with a crankshaft 6, and a servo-assisted drivetrain 7, which transmits the torque generated by the internal combustion engine 5 to the rear drive wheels 3 and has the configuration referred to as "transaxle". The drivetrain 7 comprises a drive shaft 8, which, on one side, is connected to the crankshaft 6 and, on the other side, is mechanically connected to a transmission 9, which is provided with at least one clutch and is arranged in rear longitudinal position. The transmission 9 is connected, in a train-like manner, to an electronically controlled self-locking differential 10, from which a pair of axle shafts 11 start, each integral to a respective rear drive wheel 3.

Each wheel 2 or 3 is mechanically connected to a frame 12 of the road vehicle 1 by means of a suspension 13 (partially shown on FIG. 1), which is provided with an electronically controlled actuator 14, which allows both the elastic stiffness and the damping of the suspension element to the changed (increased or decreased). By way of example, the actuator 14 can adjust, in parallel with the traditional elastic elements of the suspension 13 (helical springs and passive hydraulic shock absorbers), both the installed vertical stiffness and the damping constant of the suspension 13. By way of example, this adjustment can be carried out by different elements, such as electronically controlled anti-roll bars and magnetic-rheological shock absorbers.

The electronically controlled actuators 14 allow the stiffness of the connection of the four wheels 2 and 3 to the frame 12 of the road vehicle 1 to be changed and, hence, allow for a change in the distribution, to the four wheels 2 and 3, of the vertical load acting upon the wheels 2 and 3 in dynamic situations, namely when there is a longitudinal or lateral acceleration. In other words, by changing the stiffness of the electronically controlled actuators 14 it is possible to change the distribution of the vertical load to the four wheels 2 and 3 and, hence, change the punctual vertical load acting upon each wheel 2 and 3.

Figure 2:
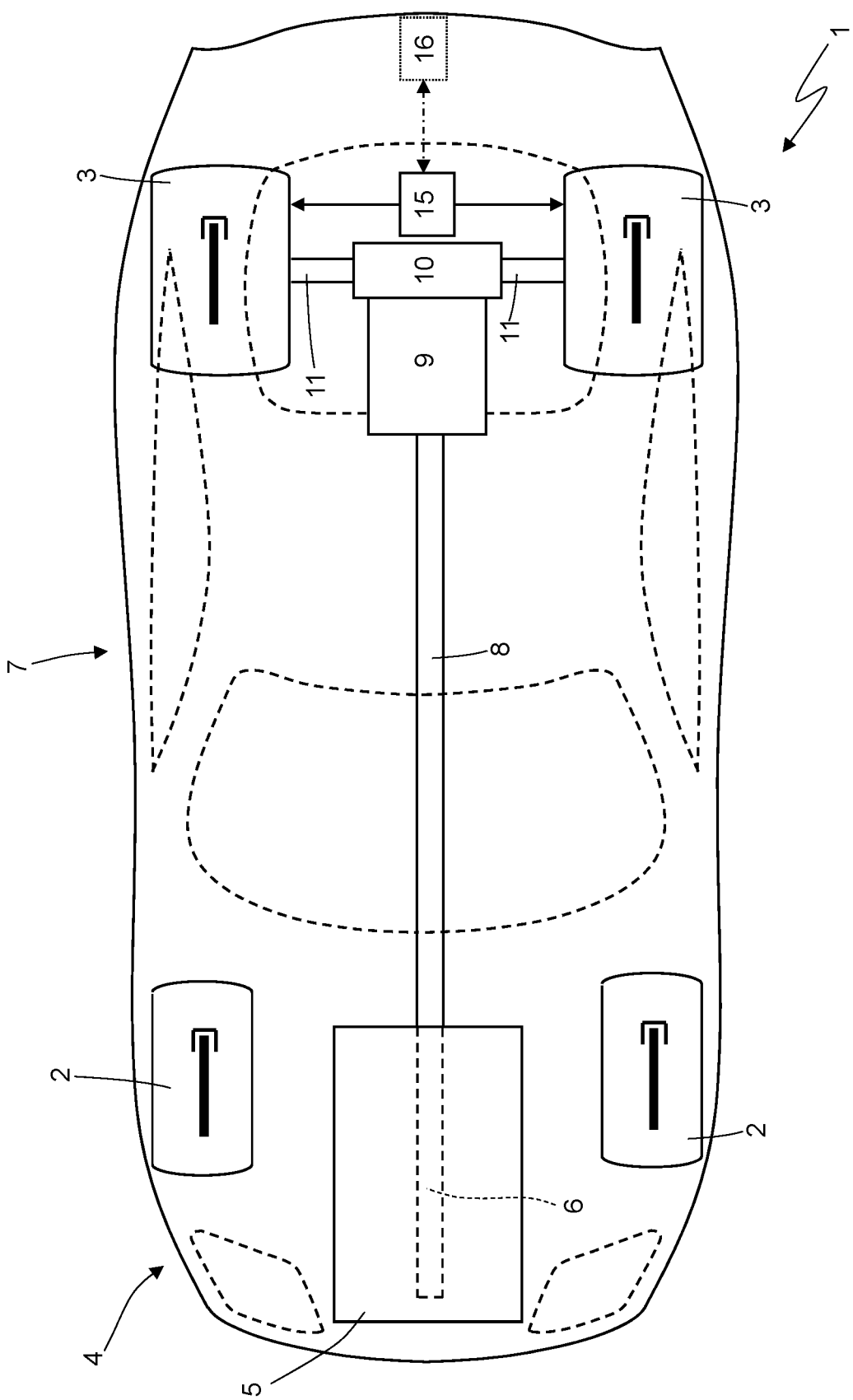
FIG. 2 is a schematic plan view of the road vehicle of FIG. 1, highlighting a rear wheel steering mechanism.

According to FIG. 2, the rear drive wheels 3 are steering wheels, namely they are carried by the corresponding suspensions 13 so that they can rotate together (namely, with the same rotation degree) to the right or to the left around a vertical axis in order to change the corresponding steering angle α (shown in FIG. 3); in particular, an (electric or hydraulic) actuator 15 is provided, which actively controls the variation of the steering angle α of the rear drive wheels 3.

While driving along a curve at a high speed (for example exceeding 60 km/h), the steering of the rear drive wheels 3 increases the stability of the road vehicle 1; in particular, in order to improve the stability of the road vehicle 1 while it drives along a curve at a high speed, the rear drive wheels 3 are caused to steer in phase (namely, in the same direction as the steering of the front wheels 2, which means that, when the front wheels 2 steer to the right, the rear drive wheels 3 steer to the right as well). In other words, the in-phase steering of the rear drive wheels 3 counters the centrifugal force that tends to cause the rear part of the vehicle to skid while driving along the curve, thus allowing the rear part of the vehicle to adapt to the ideal trajectory, increasing stability and effectiveness. In this situation, the rear drive wheels 3 are caused to steer with a steering angle α which usually is smaller than 1-2° and normally depends on the steering angle of the front wheels 2 (namely, the greater the steering angle of the front wheels 2, the greater the steering angle α of the rear drive wheels 3).

In case of manoeuvres at a low speed (for example up to 60 km/h), the steering of the rear drive wheels 3 significantly decreases the steering radius; in particular, in order to increase the manoeuvrability of the road vehicle 1 at a low speed, the rear drive wheels 3 are caused to steer in counter-phase (namely, in an opposite direction relative to the steering of the front wheels 2, which means that, when the front wheels 2 steer to the right, the rear drive wheels 3 steer to the left and vice versa) with a maximum angle of 3-5°, depending on the steering angle of the front wheels 2 (namely, the greater the steering angle of the front wheels 2, the greater the steering angle α of the rear drive wheels 3).

The road vehicle 1 comprises an electronic control unit 16 ("ECU"), which, among other things, adjusts the behaviour of the road vehicle 1 while it drives along a curve by acting, as described more in detail below, upon the electronically controlled actuators 14 of the suspensions 13 and upon the actuator 15, so as to control the steering angle α of the rear drive wheels 3. The control unit 16 can physically consist of one single device or of different devices separate from one another and communicating with one another through the CAN network of the road vehicle 1.

Figure 3:
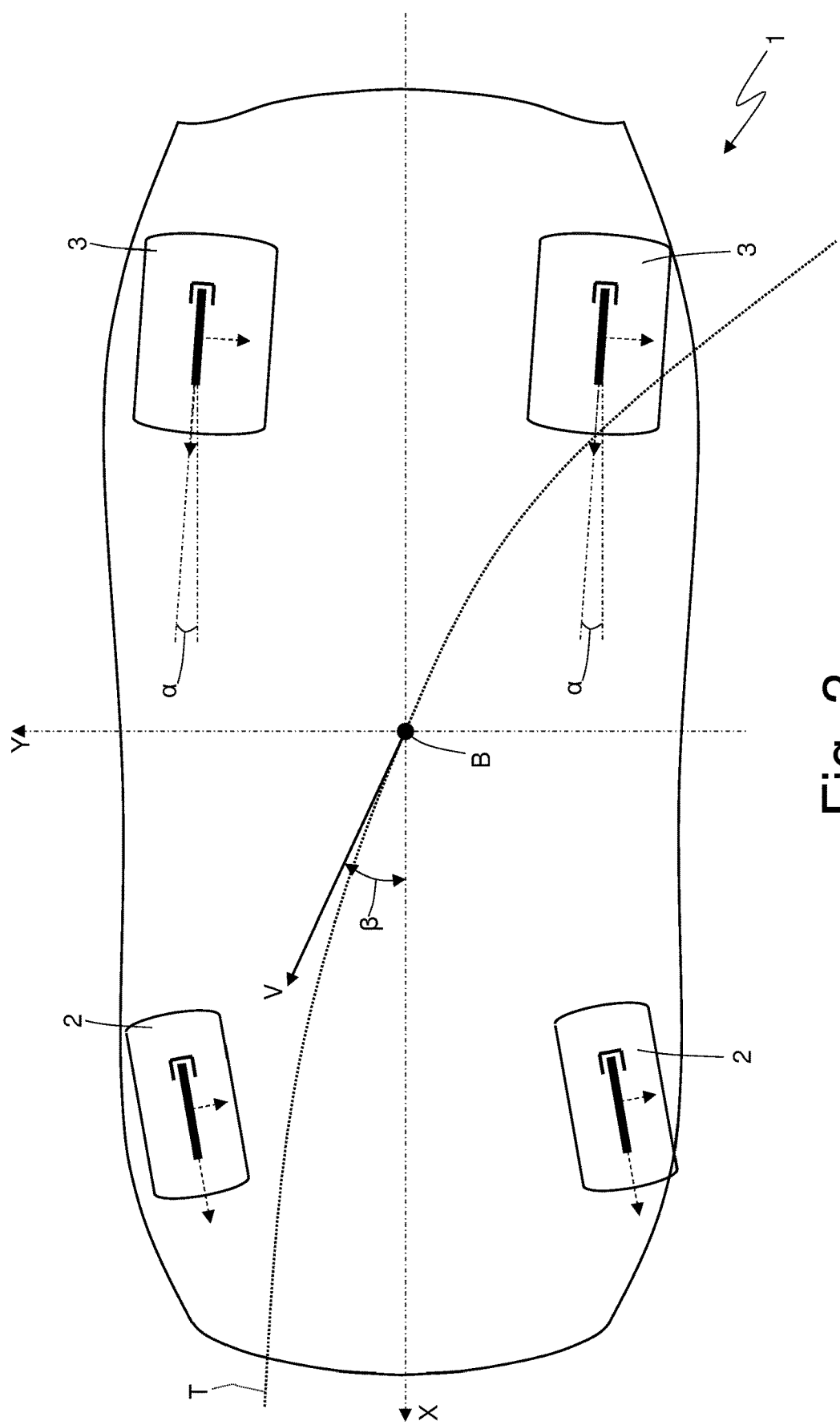
FIG. 3 is a schematic plan view of the road vehicle of FIG. 1 while driving along a curve, highlighting the trajectory, the driving speed and the attitude angle.

According to FIG. 3, when driving along a curve, the control unit 16 determines, in a known manner, the attitude angle β of the road vehicle 1 (namely, the angle comprised between the longitudinal axis x of the road vehicle 1 and the direction of the driving speed V of the road vehicle 1 in the centre of gravity B). By way of example, the control unit 16 estimates the trajectory T followed by the road vehicle 1 using the measures provided in real time by a triple-axis gyroscope and by a GPS tracking unit; in particular, the trajectory T is determined by integrating twice in time the accelerations measured by the triple-axis gyroscope and the measures provided by the GPS tracking unit are used to cyclically cancel the position errors occurring during the integration process. Furthermore, the control unit 16 estimates the driving speed V of the road vehicle 1 in the centre of gravity B using the measures provided in real time by the triple-axis gyroscope; in particular, the speed V of the road vehicle 1 in the centre of gravity B is determined by integrating once in time the accelerations measured by the triple-axis gyroscope (making sure that the driving speed V of the road vehicle 1 in the centre of gravity B actually is tangent to the trajectory T followed by the road vehicle 1, otherwise, in case of a significant deviation, at least one further iteration of the calculation is carried out making corrections to the parameters used).

While driving along a curve, the control unit 16 determines in real time (for example as described below) the actual (real) attitude angle β of the road vehicle 1. Furthermore, while driving along a curve, the control unit 16 determines a desired (ideal) attitude angle $\beta_{TGT}$, which allows the performance (i.e. the driving speed along the curve) to be maximized, keeping at the same time the vehicle 1 in stable conditions (i.e. completely safe conditions).

According to a possible (though non-binding) embodiment, the control unit 16 cyclically estimates (for example with a frequency of at least some dozens of Hz and in a known manner) a grip of the wheels 2 and 3 to the road surface, determines a radius of curvature of the trajectory T of the road vehicle 1 (namely, determines a curvature degree of the trajectory T) and determines the driving speed V of the road vehicle 1. Depending on the grip of the wheels 2 and 3 (hence, on the stability of the road vehicle 1), on the radius of curvature of the trajectory T and on the driving speed V, the control unit 16 cyclically determines the desired attitude angle $\beta_{TGT}$; in particular, in order to determine the desired attitude angle $\beta_{TGT}$, the control unit 16 can use a predetermined map (usually established in an experimental manner during a design and set-up phase of the road vehicle 1 and stored in a memory) or a mathematical model of the road vehicle 1.

Figure 4:
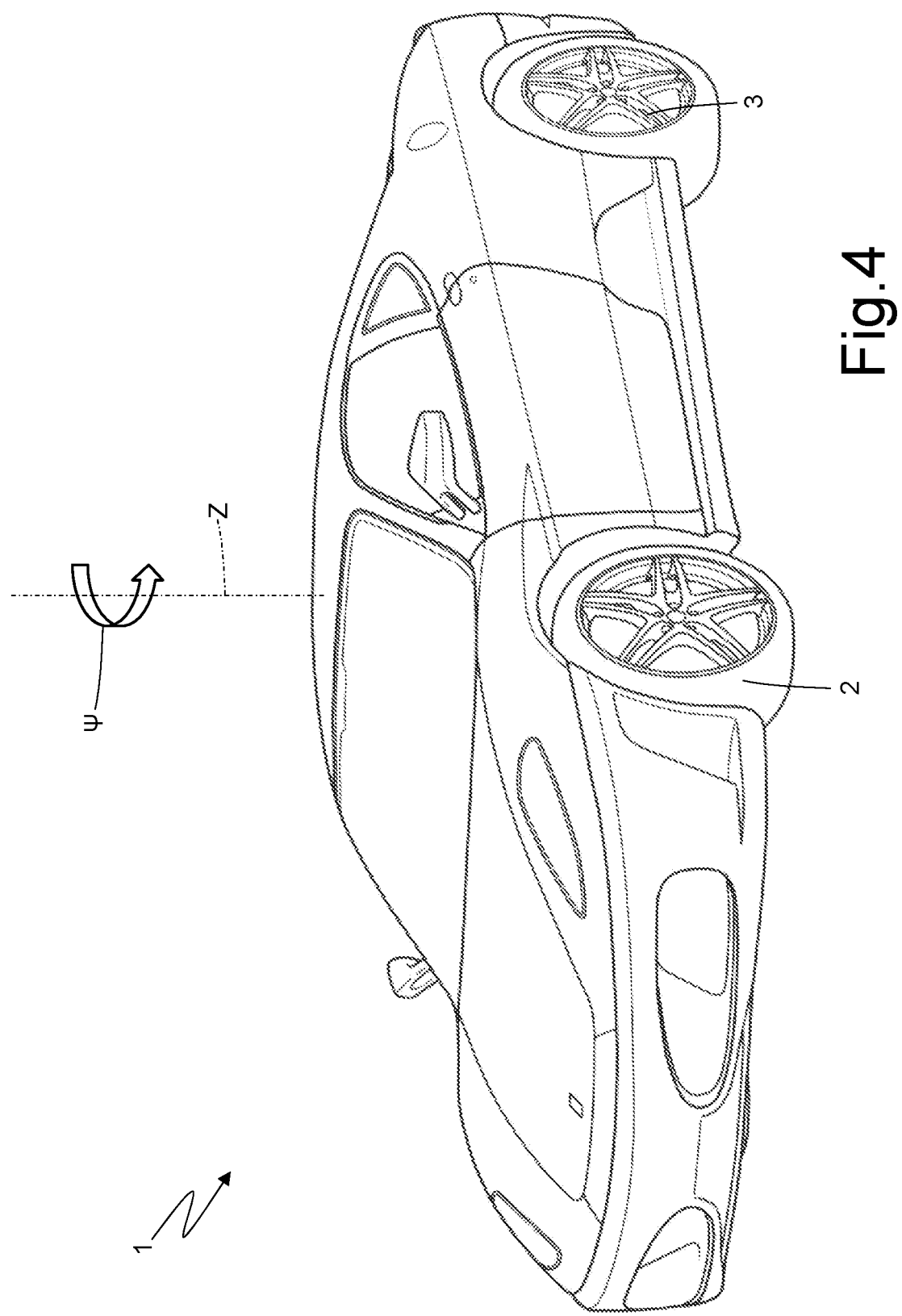
FIG. 4 is a schematic perspective view of the road vehicle of FIG. 1, highlighting the yaw angle.

While driving along a curve, the control unit 16 determines, in a known manner, an actual yaw rate dψ/dt of the road vehicle 1; the yaw rate dψ/dt is rate of variation of the yaw angle ψ (shown in FIG. 4), namely the first time derivative of the yaw angle ψ. As it is known, the yaw angle ψ represents the oscillation of the road vehicle 1 around the vertical axis Y going through the centre of gravity B of the road vehicle 1.

Figure 5:
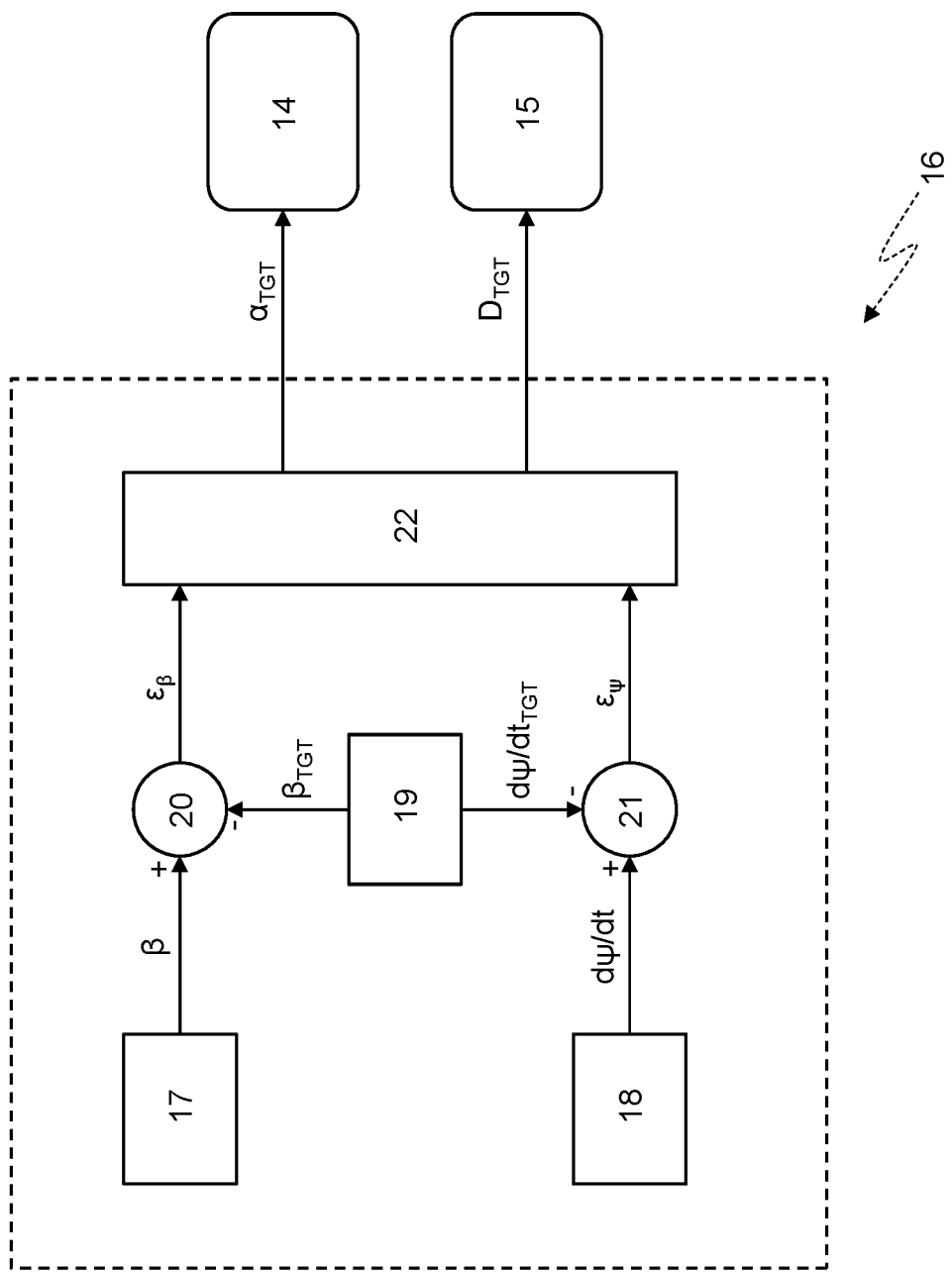
FIG. 5 is a block diagram showing a logic of the control method according to the invention.

While driving along a curve and according to FIG. 5, the control unit 16 determines the actual attitude angle β of the road vehicle 1, establishes the desired attitude angle $β_{TGT}$, determines the actual yaw rate dψ/dt of the road vehicle 1, establishes the desired yaw rate $dψ/dt_{TGT}$ and then changes, in a simultaneous and coordinated manner, the steering angle α of the rear wheels 3 and the distribution of the stiffness of the connection of the four wheels 2 and 3 to the frame 12 depending on the difference $ε_β$ between the actual attitude angle β and the desired attitude angle $β_{TGT}$ and depending on the difference $ε_ψ$ between the actual yaw rate dψ/dt and the desired yaw rate $dψ/dt_{TGT}$.

FIG. 5 schematically shows what described above and discloses that the control unit 16 comprises: a calculation block 17, which determines the actual attitude angle β of the road vehicle 1, a calculation block 18, which determines the actual yaw rate dψ/dt of the road vehicle 1, a calculation block 19, which establishes the desired attitude angle $β_{TGT}$ and the desired yaw rate $dψ/dt_{TGT}$, a subtracter block 20, which calculates the difference $ε_β$ between the actual attitude angle β and the desired attitude angle $β_{TGT}$, a subtracter block 21, which calculates the difference $ε_ψ$ between the actual yaw rate dψ/dt and the desired yaw rate $dψ/dt_{TGT}$, and, finally, a calculation block 22, which controls, in a simultaneous and coordinated manner, the electronically controlled actuators 14 (so as to change the distribution of the stiffness of the connection of the four wheels 2 and 3 to the frame 12) and the actuator 15 (so as to change the steering angle α of the rear wheels 3).

According to a preferred embodiment, the calculation block 22 determines, together (namely, in a simultaneous and coordinated manner) and depending on the two differences $ε_β$ and $ε_ψ$, a desired steering angle $α_{TGT}$ of the rear wheels 3 (with which it controls the actuator 15) and a desired distribution $D_{TGT}$ of the stiffness of the connection of the four wheels 2 and 3 to the frame 12 (with which it controls the electronically controlled actuators 14).

According to a preferred embodiment, the calculation block 22 determines the desired steering angle $α_{TGT}$ of the rear wheels 3 and the desired distribution $D_{TGT}$ of the stiffness of the connection of the four wheels 2 and 3 to the frame 12 by combining, together, an open loop control logic and a feedback control logic.

Furthermore, according to a preferred embodiment, the desired steering angle $α_{TGT}$ of the rear wheels 3 and the desired distribution $D_{TGT}$ of the stiffness of the connection of the four wheels 2 and 3 to the frame 12 are determined by one single common mathematical model (which, hence, coordinates, together, the action upon the steering of the rear wheels 3 and the action upon the distribution of the stiffness)

According to a preferred embodiment, the actual attitude angle β and the desired attitude angle $β_{TGT}$ are compared in the time domain; namely, the actual attitude angle β is directly compared, instant by instant, with the desired attitude angle $β_{TGT}$. On the other hand, the actual yaw rate dψ/dt and the desired yaw rate $dψ/dt_{TGT}$ are compared in the frequency domain. The time domain analysis applied to the actual attitude angle β indicates the standard description thereof relative to the tine variable, as opposed to the frequency domain analysis applied to the yaw rate $dψ/dt_{TGT}$, which, on the other hand, indicates the description thereof in terms of range (spectrum) of frequencies. In the frequency domain, the yaw rate $dψ/dt_{TGT}$ is considered as an overlap of complex sinusoids, each representing a given frequency (the respective phase is normally ignored).

According to a preferred embodiment, the calculation block 22 of the control unit 16 is programmed in such a way that, while driving along a curve under medium-low lateral acceleration conditions (typically referred to as merely "linear" field with lateral accelerations generally smaller than 4-6 m/s², namely when the lateral acceleration is smaller than a threshold value ranging from 4 to 6 m/s² and, for example, equal to 5 m/s²), the actuation entails enhancing the dynamic response of the road vehicle 1 following a command of the driver, which is exerted by steering the front wheels 2. The coordination between the steering angle α of the rear wheels 3 and the desired distribution $D_{TGT}$ of the stiffness of the connection of the four wheels 2 and 3 to the frame 12 favours the determination of the steering angle α of the rear wheels 3, so as to favour the quick generation of lateral force from the rear wheels 3, then associating, when necessary, the stiffness distribution $D_{TGT}$. In other words, while driving along a curve under medium-low lateral acceleration conditions, the master action is uniquely carried out by the variation of the steering angle α of the rear wheels 3, whereas the desired distribution $D_{TGT}$ of the stiffness of the connection of the four wheels 2 and 3 to the frame 12 is adjusted as a mere slave action relative to the variation of the steering angle α of the rear wheels 3 (namely, it is adjusted so as to adapt to the variation of the steering angle α of the rear wheels 3).

According to a preferred embodiment, the calculation block 22 of the control unit 16 is programmed in such a way that, under high lateral acceleration conditions (which typically means close to the lateral stability limit, namely when the lateral acceleration is close to the lateral stability limit), the actuation entails maximizing the lateral stability. By way of example, the lateral acceleration is close to the lateral stability limit when it is 1-2 m/s² away from the maximum lateral acceleration representing the lateral stability limit; namely, the lateral acceleration is close to the lateral stability limit when the difference between the current lateral acceleration and the maximum lateral acceleration representing the lateral stability limit is smaller than a threshold value ranging from 1 to 2 m/s² and, for example, equal to 1.5 m/s². From another point of view, the lateral acceleration is close to the lateral stability limit when the current lateral acceleration reaches (exceeds) 85% of the maximum lateral acceleration representing the lateral stability limit. It should be pointed out that the maximum lateral acceleration is not a constant value applying to all conditions, but it is cyclically updated (estimated) by the control unit 16; in particular, the maximum lateral acceleration basically varies depending on the grip conditions due to the interaction between the tyres and the road surface.

The coordination between the steering angle α of the rear wheels 3 and the desired distribution $D_{TGT}$ of the stiffness of the connection of the four wheels 2 and 3 to the frame 12 favours the maximization of the ability to generate lateral force of the front axle shaft (consisting of the two front wheels 2) and of the rear axle shaft (consisting of the two rear wheels 3), said generation ability varying depending on the curve covering conditions, namely the presence of a driving or braking longitudinal force (at beginning or at the end of the curve) or the mere curve covering. In this situation, the main role is played by the action linked to the distribution $D_{TGT}$ of the stiffness of the connection of the four wheels 2 and 3 to the frame 12, which is then associated with the in-phase steering of the steering angle α of the rear wheels 3. In other words, while driving along a curve under high lateral acceleration conditions, the master action is uniquely carried out by the variation of the desired distribution $D_{TGT}$ of the stiffness of the connection of the four wheels 2 and 3 to the frame 12, whereas the steering angle α of the rear wheels 3 is adjusted as a mere slave action relative to the variation of desired stiffness distribution $D_{TGT}$ (namely, it is adjusted so as to adapt to the variation of the desired distribution $D_{TGT}$).

In this particular dynamic situation, in order to maximize the lateral force generation ability of the front wheels 2 and of the rear wheels 3, it is convenient to reduce the height of the centre of gravity of the road vehicle 1 through the adjustment of the stiffness of the connection of the four wheels 2 and 3 to the frame 12, this time by selectively acting upon the electronically controlled (front and rear) actuators 14 that are on the inside or on the outside of the curve.

According to a preferred embodiment, the calculation block 22 of the control unit 16 is programmed in such a way that, while driving along a curve and when the motion conditions are intermediate between the two situations described above (namely, between the medium-low lateral acceleration conditions and the high lateral acceleration conditions), the adjustment can be carried out in a coordinated manner, taking into account the dynamic need to reduce the response times of the rear axle by means of a quick response of the force generated by the rear wheels 3 following the command of steering of the front wheels 2 requested by the driver as well as the need to adjust the elastic stiffness, for example in order to reduce the roll movement of the road vehicle or optimize the variations of the characteristic angles of the suspensions 13 in the presence of a combined action of steering and vertical shaking. In other words, when the motion conditions are intermediate between the two situations described above (namely, between the medium-low lateral acceleration conditions and the high lateral acceleration conditions), the master action comprises both the variation of the desired distribution $D_{TGT}$ of the stiffness of the connection of the four wheels 2 and 3 to the frame 12 and the variation of the steering angle α of the rear wheels 3, namely the desired distribution $D_{TGT}$ of the stiffness of the connection of the four wheels 2 and 3 to the frame 12 and the variation of the steering angle α of the rear wheels 3 are adjusted with the same hierarchical level (namely, they are both "master" actions, without one of them prevailing over the other).

In the embodiment shown in the accompanying figures, the control unit 16 acts upon the electronically controlled actuators 14 in order to change the dynamic response of the suspensions 13 connecting the wheels 2 and 3 to the frame 12; namely, the electronically controlled actuators 14 allow for a change in the dynamic response of the suspensions 13 connecting the wheels 2 and 3 to the frame 12 and, hence, allow for a change in the distribution of the roll stiffness of the connection of the four wheels 2 and 3 to the frame 12.

As already mentioned above, the electronically controlled actuators 14 can comprise four electronically controlled shock absorbers (one for each wheel 2 or 3) and/or two electronically controlled anti-roll bars (a front and a rear one, respectively).

The embodiments described herein can be combined with one another, without for this reason going beyond the scope of protection of the invention.

The control method described above has different advantages.

First of all, the control method described above maximizes the performances of the road vehicle while driving along a curve (namely, maximizes the curve covering speed) without making the road vehicle 1 unstable (namely, getting close to the stability limit of the vehicle 1, though keeping a suitable safety margin).

Furthermore, the control method described above is particularly safe, as it always keeps the road vehicle 1 under control and is always able to quickly and effectively take action in case of need.

The control method described above maximizes the dynamic response speed of the vehicle following a steering command requested by the driver to the front wheel 2.

Finally, the control method described above, besides maximizing performances of the road vehicle as disclosed above, allows for a unified control of the road vehicle 1 in its entire use field, namely ranging from low to high lateral accelerations, by implementing a combined adjustment of the actuators, and fulfils the need to adjust the characteristic angles of the suspensions 13 and to reduce the roll movement of the car body.

LIST OF THE REFERENCE NUMBERS OF THE FIGURES

1 vehicle
2 front wheels
3 rear wheels
4 powertrain system
5 engine
6 crankshaft
7 drivetrain
8 drive shaft
9 mechanical transmission
10 self-locking differential
11 axle shafts
12 frame
13 suspension
14 electronically controlled actuator
15 actuator for the rear steering wheels
16 control unit
17 calculation block
18 calculation block
19 calculation block
20 subtracter block
21 subtracter block
22 calculation block
B centre of gravity
β attitude angle
ψ yaw angle
Z vertical axis
X longitudinal axis
Y transverse axis
Z vertical axis
α steering angle of the rear wheels
D stiffness distribution

The invention claimed is:

1. A method to control, while driving along a curve, a road vehicle (1) with a variable stiffness and with rear steering wheels (3); the road vehicle (1) comprises: a frame (12), four wheels (2, 3), at least one first actuator (14), which is designed to change a distribution of the stiffness of a connection of the four wheels (2, 3) to the frame (12), and at least one second actuator (15), which is designed to change a steering angle (α) of the rear wheels (3); the control method comprises the steps of:

determining an actual attitude angle (β) of the road vehicle (1);

establishing a desired attitude angle ($β_{TGT}$);

determining an actual yaw rate ($d\psi/dt$) of the road vehicle (1);

establishing a desired yaw rate ($d\psi/dt_{TGT}$);

changing, in a simultaneous and coordinated manner, the steering angle ($\alpha$) of the rear wheels (3) and the distribution of the stiffness of the connection of the four wheels (2, 3) to the frame (12) depending on a difference ($\varepsilon_\beta$) between the actual attitude angle ($\beta$) and the desired attitude angle ($\beta_{TGT}$) and depending on a difference ($\varepsilon_\psi$) between the actual yaw rate ($d\psi/dt$) and the desired yaw rate ($d\psi/dt_{TGT}$); and controlling as a priority, while driving along the curve and when a lateral acceleration is smaller than 4-6 m/s², a steering action of the rear wheels (3) in order to maximize a dynamic response of the road vehicle (1) to a command of steering of the front wheels (2) requested by a driver, adjusting accordingly the distribution of the stiffness of the connection of the four wheels (2, 3) to the frame (12) by means of the first actuator (14).

2. The control method according to claim 1, wherein, while driving along the curve and when the lateral acceleration is smaller than 4-6 m/s², a master action is uniquely carried out by a variation of the steering angle ($\alpha$) of the rear wheels (3), whereas the distribution ($D_{TGT}$) of the stiffness of the connection of the four wheels (2, 3) to the frame (12) is adjusted as a slave action relative to the variation of the steering angle ($\alpha$) of the rear wheels (3).

3. The control method according to claim 1, wherein, while driving along the curve and when the lateral acceleration is smaller than 4-6 m/s², the distribution ($D_{TGT}$) of the stiffness of the connection of the four wheels (2, 3) to the frame (12) is adjusted only so as to adapt to a variation of the steering angle ($\alpha$) of the rear wheels (3).

4. The control method according to claim 1 and comprising a step of controlling as a priority, while driving along the curve and when the lateral acceleration is close to a stability limit, the distribution of the stiffness of the connection of the four wheels (2, 3) to the frame (12) in a consistent manner with a curve covering phase, adjusting accordingly the steering angle ($\alpha$) of the rear wheels (3).

5. The control method according to claim 4, wherein, while driving along the curve and when the lateral acceleration is close to the stability limit, a master action is uniquely carried out by a variation of the distribution ($D_{TGT}$) of the stiffness of the connection of the four wheels (2, 3) to the frame (12), whereas the steering angle ($\alpha$) of the rear wheels (3) is adjusted as a slave action relative to the distribution ($D_{TGT}$) of the stiffness of the connection of the four wheels (2, 3) to the frame (12).

6. The control method according to claim 4, wherein, while driving along the curve and when the lateral acceleration is close to the stability limit, the steering angle ($\alpha$) of the rear wheels (3) is adjusted only so as to adapt to the distribution ($D_{TGT}$) of the stiffness of the connection of the four wheels (2, 3) to the frame (12).

7. The control method according to claim 4 and comprising a step of lowering, while driving along a curve and when the lateral acceleration is close to the stability limit, a centre of gravity of the road vehicle (1) by changing the distribution ($D_{TGT}$) of the stiffness of the connection of the four wheels (2, 3) to the frame (12).

8. The control method according to claim 1 and comprising a step of simultaneously adjusting, with the same hierarchical level, while driving along the curve and when the lateral acceleration is greater than 4-6 m/s² and smaller than a stability limit, the steering angle ($\alpha$) of the rear wheels (3) and the distribution ($D_{TGT}$) of the stiffness of the connection of the four wheels (2, 3) to the frame (12).

9. The control method according to claim 1, wherein the lateral acceleration is considered close to a lateral stability limit when a difference between a current lateral acceleration and a maximum lateral acceleration, which represents the lateral stability limit, is smaller than a threshold value ranging from 1 to 2 m/s².

10. The control method according to claim 1, wherein a lateral acceleration is considered close to a lateral stability limit when a current lateral acceleration reaches 85% of a maximum lateral acceleration, which represents the lateral stability limit.

11. The control method according to claim 1 and comprising a step of determining, together, a desired steering angle ($\alpha_{TGT}$) of the rear wheels (3) and a desired distribution ($D_{TGT}$) of the stiffness of the connection of the four wheels (2, 3) to the frame (12) depending on the difference ($\varepsilon_\beta$) between the actual attitude angle ($\beta$) and the desired attitude angle ($\beta_{TGT}$) and depending on the difference ($\varepsilon_v$) between the actual yaw rate ($d\psi/dt$) and the desired yaw rate ($d\psi/dt_{TGT}$).

12. The control method according to claim 11, wherein the desired steering angle ($\alpha_{TGT}$) of the rear wheels (3) and the desired distribution ($D_{TGT}$) of the stiffness of the connection of the four wheels (2, 3) to the frame (12) are determined by combining, together, an open loop control logic and a feedback control logic.

13. The control method according to claim 11, wherein the desired steering angle ($\alpha_{TGT}$) of the rear wheels (3) and the desired distribution ($D_{TGT}$) of the stiffness of the connection of the four wheels (2, 3) to the frame (12) are determined by one single common mathematical model.

14. The control method according to claim 1, wherein the actual attitude angle ($\beta$) and the desired attitude angle ($\beta_{TGT}$) are compared in a time domain.

15. The control method according to claim 1, wherein the actual yaw rate ($d\psi/dt$) and the desired yaw rate ($d\psi/dt_{TGT}$) are compared in a frequency domain.

16. The control method according to claim 1, wherein the first actuator (14) changes the dynamic response of the suspensions (13) connecting the wheels (2, 3) to the frame (12) and comprises electronically controlled shock absorbers or the first actuator (14) changes the dynamic response of the suspensions (13) connecting the wheels (2, 3) to the frame (12) and comprises electronically controlled anti-roll bars.

* * * * *